United States Patent [19]

Hurford et al.

[11] Patent Number: 5,468,816
[45] Date of Patent: Nov. 21, 1995

[54] SILICONE RELEASE COMPOSITIONS

[75] Inventors: Simon R. Hurford, Cardiff; Bhukandas Parbhoo, Barry, both of Wales

[73] Assignee: Dow Corning Limited, Barry, Wales

[21] Appl. No.: 330,952

[22] Filed: Oct. 28, 1994

[30] Foreign Application Priority Data

Nov. 5, 1993 [GB] United Kingdom .................. 9322794

[51] Int. Cl.$^6$ ................................................. C08F 283/12
[52] U.S. Cl. ............................. 525/479; 528/15; 528/25; 524/482; 524/862; 524/848; 427/387; 556/479
[58] Field of Search ......................... 528/15, 25; 525/479; 524/483, 862, 848; 427/387; 556/479

[56] References Cited

U.S. PATENT DOCUMENTS

| | | | |
|---|---|---|---|
| 4,123,604 | 10/1978 | Sandford, Jr. | 528/31 |
| 4,472,563 | 9/1984 | Chandra et al. | 528/15 |
| 4,526,953 | 7/1985 | Dallavia, Jr. | 528/15 |
| 4,533,575 | 8/1985 | Melancon | 528/15 |
| 4,741,966 | 5/1988 | Cavezzan | 528/15 |
| 4,830,924 | 5/1989 | Dallavia, Jr. | 524/862 |
| 5,264,499 | 11/1993 | Hayashi et al. | 528/15 |

FOREIGN PATENT DOCUMENTS

| | | |
|---|---|---|
| 0108208 | 8/1983 | European Pat. Off. . |
| 0389138 | 3/1990 | European Pat. Off. . |
| 0400614 | 5/1990 | European Pat. Off. . |
| 0516108 | 5/1992 | European Pat. Off. . |
| 0523660 | 7/1992 | European Pat. Off. . |
| 1374792 | 3/1971 | United Kingdom . |
| 1542072 | 5/1976 | United Kingdom . |
| 2045788 | 2/1980 | United Kingdom . |

*Primary Examiner*—Melvyn I. Marquis
*Attorney, Agent, or Firm*—Timothy J. Troy

[57] ABSTRACT

A release modifier which comprises (i) a MQ resin consisting essentially of units of the formulae $SiO_2$ and $R_3SiO_{1/2}$ wherein R denotes a monovalent hydrocarbon group having up to 3 carbon atoms, a hydrogen atom, a $c_{2-5}$ alkenyl group of the formula —R'CH=$CH_2$, provided there is at least one group —R'CH=$CH_2$ present per MQ molecule and (ii) a α,ω-diolefin having the general formula $CH_2$=CH—$(CH_2)_n$—CH=$CH_2$, wherein n denotes an integer with a value of from 4 to 18 gives improved release force over prior art controlled release additives. Also claimed is a solventless release composition based on siloxanes having SiH groups and a catalyst in addition to the release modifier.

20 Claims, No Drawings

SILICONE RELEASE COMPOSITIONS

This invention relates to silicone release compositions. It relates more specifically to release compositions which are not in the form of an emulsion and more preferably to solventless release compositions. The invention mainly relates to release modifiers for said compositions.

Silicone release compositions have been known for a long time and have been the subject of many publications and patent specifications. They are useful in many applications where one requires a relatively non-adherent surface. In such applications release compositions are coated onto a substrate and are caused to be cured. A particularly useful application is the coating of paper, polyethylene and other materials which are used among other applications for providing non-stick surfaces for contact with food or for backing surfaces e.g. for pressure sensitive adhesive labels, decorative laminates and transfer tapes. This invention is not concerned with release compositions in the form of an aqueous emulsion. Solventless release compositions, which are the preferred subject matter of the present invention, have also been described in numerous publications. With solventless is meant compositions which do not include any organic solvent which could be environmentally undesirable. Examples of organic solvents are e.g. toluene and xylene. The advantages of using solventless systems are well known to the person skilled in the art of release coatings.

Silicone release compositions have been described, for example in GB-1 374 792-A, which discloses a solvent-free curable silicone release coating composition, having a certain viscosity and comprising a polydimethylsiloxane having up to 5% vinyl radicals, an organopolysiloxane having at least 3 silicon-bonded hydrogen atoms and a catalyst for the addition of —SiH groups to Si-vinyl groups, the —SiH and Si-vinyl groups being present in a ratio of at least 0.5/1. In GB-1 542 072-A it was taught to mix a vinyl-containing resin in conjunction with a low molecular weight vinyl (cyclo) siloxane with the curable silicone composition to control the adhesive release force. In GB-2 045 788-A there is disclosed a composition similar to the one in GB-1 542 072-A, in which the low molecular weight vinyl siloxane can be left out.

Cured release coatings which result from the application and curing of release compositions containing vinyl-substituted polydimethyl siloxanes and organosilicon compounds with silicon-bonded hydrogen atoms have a very low release force. It is not always desirable to have the release force that low, as in many applications it is important to maintain a certain amount of adhesive behaviour, e.g. in resealable closures for diapers or to provide several release liners with differing release forces, e.g. in double backed tapes. It is known to incorporate additives into silicone-based release coatings which cause an increase in release force required to peel off e.g. an adhesive label. Such additives are called "controlled-release additives" or "CRAs" and in some cases "high-release additives" or "HRAs". Materials which are typically used as CRAs include vinylated silicone resins comprising monovalent and tetravalent siloxane groups only, the so called MQ resins.

In EP-0 108 208-A it is taught that the use of vinylated MQ resins in conjunction with some unsaturated reactive diluents selected from dibutylmaleate, decylvinylether, dodecylvinyl-ether, camphene, $C_{16-18}$ α-olefin and meta-bis isopropenylbenzene provides a cheaper alternative CRA. Such CRA was useful in conjunction with release compositions comprising alkenyl or silanol-functional diorganopolysiloxanes, polymethyl hydrogen siloxanes, a precious metal catalyst and certain carboxylic acid ester inhibitors. In U.S. Pat. No. 4,526,953 there is taught the use of a linear α-olefin or a mixture of α-olefins having up to 30 carbon atoms per molecule, to enhance the addition cure of a alkenyl functional siloxane with a Si—H containing siloxane in the presence of a precious metal catalyst.

Vinylated MQ resin based CRAs, even in conjunction with α-olefins do not, however, provide the industry with solutions to all their requirements. There is a continuing search for improved CRAs which will give increased release forces, especially at low delamination speeds.

We have now found that if the α-olefins are replaced by α,ω-diolefins, a release modifier (RM) is made which has improvements over CRAs in that they require increased release forces to delaminate an adhesive coated substrate.

The present invention provides a release modifier for silicone release compositions which comprises (i) a MQ resin consisting essentially of units of the formulae $SiO_2$ (Q) and $R_3SiO_{1/2}$ (M)

wherein R denotes a monovalent hydrocarbon group having up to 3 carbon atoms, a hydrogen atom, or an alkenyl group of the formula —R'CH=CH$_2$ wherein R' denotes an alkylene group of from 0 to 3 carbon atoms, provided there is at least one group —R'CH=CH$_2$ present per MQ molecule and (ii) a α,w-diolefin having the general formula CH$_2$=CH—(CH$_2$)$_n$— CH=CH$_2$, wherein B denotes an integer with a value of from 4 to 18.

Suitable MQ resins for use in the RMs according to the invention are known materials and have been described in several publications, e.g. in U.S. Pat. No. 4,123,604. They consist essentially of monovalent and tetravalent siloxane units as indicated above, preferably they consist only of such units. However, it is allowable to have some other units present in small amounts without causing any negative effect. Extra units may include HOR$_2$SiO$_{1/2}$ units and even some divalent and trivalent siloxane units, provided the extra units do not make up more than 3% of the total number of units in the resin molecule. It is also preferred that monovalent units wherein R denotes a hydrogen atom are kept to a minimum. These latter units may be present as a result of incomplete reaction of the reagents used to form the MQ resin, depending on the manufacturing method. It is preferred that the group R which is not an alkenyl group of the formula —R'CH=CH$_2$ is an alkyl group, most preferably a methyl group.

Suitable MQ resins for use in the RM according to the invention preferably have a ratio of M units to Q units of from 0.6/1 to 1.1/1. These preferred MQ resins are toluene soluble copolymers. It is also preferred that the presence of silicon-bonded hydroxyl groups is kept below 0.7% by weight of the total weight of the MQ resin, more preferably below 0.3%. Preferably there are at least two alkenyl groups —R'CH=CH$_2$ per molecule. It is most preferred that the alkenyl groups present on the MQ resin are vinyl groups. It is preferred that the amount of alkenyl present in the MQ resin is in the range of from 1 to 10% by weight where the alkenyl is vinyl. More preferably the MQ resin will contain 1.5 to 4% by weight of vinyl, most preferably 1.7 to 2.5%. For other alkenyl groups it is preferred that an equivalent number of alkenyl groups is present compared to the vinyl groups in the preferred resin.

MQ resins which are suitable for use in the RMs according to the invention are well known as is their method of preparation. Preparation methods have been described and include the making of an MQ resin having a number of silanol groups, followed by the reaction of that resin with capping groups which include hexaorganodisilazane wherein the organo group could be e.g. methyl or vinyl. Particularly useful capping groups are hexamethyldisilazane and tetramethyldivinylsilazane. Where larger alkenyl groups are required, e.g. pentenyl groups, it is possible to make them by an addition reaction of a dialkene, e.g. α,ω-pentadiene, to a MQ resin having at least one silicon-bonded hydrogen atom in one of its monofunctional units ($R_3SiO_{1/2}$), in the presence of a catalyst which promotes the addition reaction between a group —SiH to an olefinic unsaturated compound. MQ resins having silicon-bonded hydrogen atoms are also known materials and have been described in a number of publications, as are methods for making them. The reader is referred to e.g. EP-A-0 389 138.

The second essential ingredient of the RMs according to the invention is a α,ω-diolefin of the general formula $CH_2=CH-(CH_2)_n-CH=CH_2$, wherein n denotes an integer with a value of from 4 to 18. These materials are known and many are commercially available. Particularly preferred diolefin compounds are those where the value of is from 6 to 12, most preferably 8 to 10. Examples of suitable diolefins are α,ω-octadiene, α,ω-decadiene, α,ω-dodecadiene and α,ω-tetradecadiene.

RMs according to the present invention may also comprise other ingredients, but are preferably solventless. Suitable ingredients include diluents, preferably siloxane materials. A particularly preferred siloxane material would be a linear alkenyl-substituted polydimethylsiloxane material, e.g. a α,ω-vinyl end-blocked dimethylpolysiloxane having a chainlength of from 10 to 500 siloxane units, preferably 15 to 100, most preferably 20 to 50.

RMs according to the present invention may also comprise inhibitors. These are known in the art and include dialkyl carboxylic esters containing C=C unsaturation, e.g. diallylmaleate, dimethylmaleate and butylallylmaleate and cyclic siloxanes of the general formula $[(A)_2SiO]_n$ wherein A denotes a group selected from lower alkyl groups, preferably $C_{1-4}$ alkyl groups and lower alkenyl groups, preferably vinyl or allyl groups, and n has a value of from 3 to 8. Most preferred are those cyclic siloxanes in which each silicon atom has one alkyl and one alkenyl group, preferably a methyl and a vinyl group. Preferably the value of n is 4 or 5. Examples of the most preferred siloxanes are methylvinyltetracyclosiloxane and methylvinylpentacyclosiloxane.

Other suitable ingredients for the RMs are catalysts. As the RM is intended for formation of crosslinked siloxane coatings by addition reaction with an organosilicon compound having silicon-bonded hydrogen atoms, suitable catalyst would be catalysts which promote said addition reaction. Suitable catalysts are accordingly those based on precious metals. A particularly suitable catalyst is a group VIII metal or a complex or compound thereof, platinum or rhodium based catalysts. Preferably it is a platinum compound or complex. Suitable platinum compounds and complexes include chloroplatinic acid, platinum acetylacetonate, complexes of platinous halides with unsaturated compounds such as ethylene, propylene, organovinylsiloxanes and styrene, hexamethyldiplatinum, $PtCl_2.PtCl_3$ and $Pt(CN)_3$. The preferred platinum catalysts are complexes of platinum compounds and vinyl siloxanes, e.g. those formed by the reaction of chloroplatinic acid and divinyltetramethyl disiloxane.

RMs according to the invention preferably comprise from 10 to 90% by weight of the MQ resins indicated above and from 90 to 5% of the α,ω-diolefin. More preferably 40 to 80%, and most preferably 50 to 75% by weight of the RM is taken up with the MQ resin. More preferably the amount of α,ω-diolefin is from 10 to 50%, most preferably 15 to 35%. The balance to 100% can be taken up by optional ingredients preferably, however, by an alkenyl-functional polysiloxane, which will help to solubilise the MQ resin in the RM and a catalyst. Sufficient of the catalyst should be employed to provide a homogenous and effective cure of the composition. The preferred proportion of platinum catalyst is usually that which will provide from about 1 to about 400 parts by weight of Pt per million parts by weight of the combined crosslinking components used in the total coating composition in which the RM is used, more preferably 50 to 150 parts, most preferably 100 to 130 parts.

In another aspects the invention provides novel solventless release compositions, which incorporate the RMs described above.

There is provided a solventless release composition comprising (A) a release modifier which comprises (i) a MQ resin consisting essentially of units of the formulae $SiO_2$ (Q) and $R_3SiO_{1/2}$ (M)

wherein R denotes a monovalent hydrocarbon group having up to 3 carbon atoms, a hydrogen atom, an alkenyl group of the formula —R'CH=$CH_2$ wherein R' denotes an alkylene group from 0 to 4 carbon atoms, provided there is at least one group —R'CH=$CH_2$ present per MQ molecule and (ii) a α,w-diolefin having the general formula $CH_2=CH-(CH_2)_n-CH=CH_2$, wherein n denotes an integer with a value of from 4 to 18; (B) an organosilicon compound having at least three silicon-bonded hydrogen atoms per molecule; (C) an effective amount of a precious metal catalyst capable of promoting the addition reaction between alkenyl groups and silicon-bonded hydrogen groups and (D) optionally a diorganopolysiloxane having at least 2 alkenyl-functional silicon-bonded substituents. Components (A) (i) and (ii) are as described above. Component (B) of the release composition is present as a cross-linking component or curing agent for the alkenyl functional materials by addition reaction. Suitable organosilicon compounds for the cross-linking component have at least three silicon-bonded hydrogen atoms per molecule, preferably linked to three separate silicon atoms. Preferred suitable organosilicon compounds are substantially linear or cyclic materials. However, small amounts of trifunctional or tetrafunctional siloxane units may also be present. Such units would have the general formula $SiO_2$ and $R^3SiO_{3/2}$, but they are preferably only present in amounts up to 3% based on the total number of units present in the organosilicon compounds, more preferably they are totally absent. It is preferred that the organosilicon compound has the general formula $R^2{}_2R^3SiO-[R^2{}_2SiO]_m-[R^2HSiO]_n-SiR^2{}_2R^3$ or

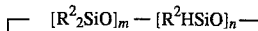

wherein $R^2$ denotes an alkyl or aryl group having up to 8 carbon atoms, $R^3$ denotes a group $R^2$ or a hydrogen atom, m has a value of from 0 to 20, n has a value of from 1 to 70, and there are at least 3 silicon-bonded hydrogen atoms present. It is not important if the silicon-bonded hydrogen atoms are on terminal silicon atoms or not. It is preferred that $R^2$ denotes a lower alkyl group having no more than 3 carbon atoms, most preferably a methyl group. $R^3$ preferably denotes a group $R^2$. Preferably m=0 and n has a value of from 6 to 40, more preferably 8 to 20, or where cyclic organosilicon materials are used, from 3 to 8. The cross-linking component may comprise a mixture of several organosilicon compounds as described. As the organosilicon compound (B) forms part of a release composition which is solventless it is preferred that the viscosity of the component is kept low, which is particularly useful when the release composition also comprises high viscosity polymers, particularly those of component (D). In this way the total viscosity of the solventless release composition is kept reasonably low, which is beneficial for the application of the composition to a substrate. Suitable viscosity for component (B) would be e.g. less than 0.1 Pa.s, preferably less than 0.05 Pa.s. Suitable organosilicon compounds are well known in the art and have been described in several publications, as is a method of making them.

The amount of cross-linking component which is used in a release coating composition is usually intended to provide a ratio of silicon-bonded hydrogen atoms over alkenyl and/or oxyalkenyl substituents of about 1/1, i.e. in stoichiometric amounts. The alkenyl substituents which have to be taken into account include those present in the MQ resin of component (A)(i), as well as those of the diolefin (A)(II) and those present in any diluent or other material present in the RM, e.g. methylvinylcyclosiloxanes and alkenyl groups present in component (D) of the release composition. It is, however, preferred to have some excess of SiH groups present to ensure complete crosslinking of the composition and to avoid the presence of siloxane material which may bleed out of the composition, thus causing unwanted and detrimental effects. Preferred SiH/Si-alkenyl ratios are from 1.1/1 to 1.8/1, more preferably 1.1/1 to 1.4/1.

Component (C) is as discussed above as a suitable catalyst ingredient for the RM composition. Some catalyst is usually already present in component (A), but additional amounts of the catalyst may be added as component (C), especially if large amounts of component (D) and small amounts of component (A) are used.

Component (D) is a polydiorganosiloxane having at least two alkenyl substituents per molecule. The alkenyl substituent may be a cycloalkenyl or linear alkenyl group, preferably with up to 6 carbon atoms, as exemplified by cyclohexenyl, vinyl, allyl, pentenyl and hexenyl. More preferred would be cyclohexenyl, vinyl or allyl groups, most preferably vinyl. The preference is based on the ready availability of suitable polymers and the efficiency of the polymers in forming a cured release coating onto a substrate. Preferred polydiorganosiloxanes have the general formula $X_2Y°SiO—[X_2SiO]_x—[XYSiO]_y—SiX_2Y°$ wherein each X denotes independently a phenyl radical or a saturated hydrocarbon group having 1 to 6 carbon atoms, e.g. alkyl or cycloalkyl group, for example, methyl, ethyl, propyl, butyl and cyclohexyl. At least 90% of all the X substituents of the polydiorganosiloxane are preferably methyl groups, most preferably all. Y denotes an alkenyl group having up to 6 carbon atoms, as identified above and Y° denotes a group Y or a group X. It is, however, preferred that each alkenyl group Y in component (D) is a vinyl or hexenyl group. It is preferred that no more than 1% of all units of the siloxane are units with an alkenyl group, as otherwise there is a danger of crosslinking the release composition too much upon curing. Although it is preferred that no silicon-bonded substituents are present apart from X, Y and Y°, it is possible that small amounts (less than 1% of all substituents present) of other substituents are present, e.g. hydroxyl groups. Even though the polydiorganosiloxanes suitable as component (D) in the composition according to the invention are substantially linear polymers, it is allowable that a small number of units (no more than 1% of the total number of units) cause branching of the polymer. Such units would be tetra-functional or trifunctional units of the formula $SiO_2$ or $Y°SiO_{3/2}$ respectively. Preferably no such units are present.

The average value of the sum total of E and y in the above formula is such that the resulting viscosity of the polydiorganosiloxane is at least 10 mPa.s at 25° C. Preferably the viscosity at 25° C. is in the range from 0.05 to 5 Pa.s, more preferably 0.1 to 1 Pa.s, most preferably 0.2 to 0.5 Pa.s. Such polydiorganosiloxanes are well known in the art as is a method for their preparation.

Release compositions according to the invention may comprise only components (A), (B) and (C). In such situations (C) would be present in catalytic amounts, while (A) and (B) would be present in amounts to give the SiH/Si-alkenyl ratio mentioned above. It is, however, preferred in all but some special applications that the release composition also comprises component (D). The amount of component (D) in relation to component (A) will depend on the desired release characteristics of the cured release coating, and a number of factors influence this amount. It is most easily expressed as the percentage of component (A) by weight based on the total weight of components (A), (C) and (D) combined. This may range from 1% to 100%, but more typically will lie in the range from 10 to 80% by weight. The factors which influence the amount of each ingredient used in the composition include the desired release force, the desired delamination speed of the final product in use, the cure time and temperature requirements, desire to avoid slipstick etc.

Optionally a release composition according to the invention comprises additional ingredients. Particularly useful optional ingredients include e.g. cure inhibitors and bath life extenders. Such additives are well known in the art and have been discussed above. Still other potential additives include colorants, dyes, preservatives and fragrances.

Release compositions according to the invention may be prepared by any known method, including mixing the ingredients. For storage stability purposes it is preferred to keep components (A) and (C) separate from component (B). This could be achieved for example by mixing components (A), (C) and part of component (D) as a first mixture, and mixing component (B) with the rest of component (D) as a second mixture. Alternatively each of the components may be stored and supplied separately. In yet another option component (A) is supplied as a first part, component (B) as a second part and a mixture of components (C) and (D) as a third part. Each part could also include some other additional ingredients, e.g. an inhibitor. Immediately prior to using the composition for application to substrates the components could be admixed in the required ratios, e.g. 1/1, 10/1 or even 100/1.

The invention also provides in another aspect a process of coating a substrate to provide release of adhesive materials therefrom, the process comprising applying to a substrate a solventless release composition as described above and thereafter causing the composition to cure.

Any solid substrate may be treated by the process of this invention to provide release of adhesive materials therefrom. Examples of suitable substrates include cellulosic materials, such as paper, cardboard and wood, metals such as aluminium, iron and steel, siliceous materials such as ceramics, glass and concrete and synthetics such as polyester and polyepoxide. To assure proper curing and adhesion of the curable release composition, the substrate to which it is applied should be clean and free of materials which undesirably inhibit the cure of the release composition, such as materials containing amines, mercaptans and phosphines.

The process of this invention is particularly useful for coating flexible substrates such as paper, aluminium foil and tapes to provide controlled release of pressure sensitive adhesive materials such as aggressive acrylic adhesives. The curable release composition may be applied in a thin layer to the surface of the flexible substrate to provide a coating with a mass of approximately one gram per square meter of coated surface. In the paper coating art, the amount of release coating will generally be applied in an amount between 0.1 to 2.0 grams per square meter of surface.

In the process according to the invention the curable release composition may be applied to a substrate by any suitable means such as brushing, dipping, spraying, rolling and spreading. Flexible substrates such as paper, may be coated by any of the well known rolling methods such as by a trailing blade coater, kiss rolls, gravure rolls and offset printing rolls as desired.

After application to a substrate the silicone release composition is allowed to cure. Preferably the curing is accelerated by the application of heat to the applied composition. Heating usually limited to temperatures less than 300° C., preferably less than 200° C., may be accomplished by any suitable means. However, the release composition should not be heated too much prior to application. In many cases release compositions according to the invention will cure to a state sufficient to give no smear, no migration and no rub-off quicker than prior art applications.

Cured release compositions according to the invention tend to result in a coating which requires a higher release force to remove adhesive therefrom at a low delamination speed (e.g. 0.5 m/minute).

There now follow a number of examples in which all parts and percentages are given by weight unless otherwise indicated.

EXAMPLE 1

A MQ resin was prepared with trimethylsiloxane and vinyldimethylsiloxane units as monofunctional units and $SiO_2$ tetrafunctional units. The M/Q number ratio was in the range 0.6/1 to 1.1/1, the amount of vinyl in the range from 4.4 to 5% by weight. ARM was prepared by mixing 65 parts by weight of this MQ resin (70% in xylene) to 23 parts of tetradecadiene and 7 parts of a dimethylvinyl end-blocked polydimethyl siloxane having a viscosity of several Pa.s. The xylene is removed by stripping under reduced pressure.

EXAMPLE 2

A first release composition (REL1) was prepared by adding to 100 parts by weight of the RM prepared in Example 1 sufficient of a mixture of a short-chain trimethylsiloxane end-blocked methylhydrogensiloxane polymer and dimethyl/methylhydrogen siloxane copolymer to give a SiH/Si-alkenyl number ratio of 1.15/1 and a catalytic amount of a platinum compound.

EXAMPLES 3 to 6

Further release compositions (REL 2 to REL 5) were prepared by mixing the RM of Example 1 with a "premium" release coating, consisting of a vinyldimethylsiloxane end-blocked polydimethylsiloxane having an average viscosity at 25° C. of about 450 mPa.s (PR1), according to the ratios given in Table I, and by mixing in each case sufficient of a mixture of a short-chain trimethylsiloxane end-blocked methylhydrogen siloxane polymer and dimethyl/methylhydrogen siloxane copolymer to give a SiH/Si-alkenyl number ratio of 1.15/1 and a catalytic amount of a platinum compound.

TABLE I

| Release Composition | RM/Premium ratio |
| --- | --- |
| REL 1 | 100/0 |
| REL 2 | 80/20 |
| REL 3 | 60/40 |
| REL 4 | 40/60 |
| REL 5 | 20/80 |

Comparative Examples 1 to 5

Release compositions CREL 1 and CREL 5 were prepared comprising only PR2 and PR1 respectively mixed in each case with sufficient of a cross-linker mixture of a short-chain trimethylsiloxane end-blocked methylhydrogen siloxane polymer and dimethyl/methylhydrogen siloxane copolymer to give a SiH/Si-alkenyl number ratio of 1.15/1 and a catalytic amount of a platinum based catalyst. PR2 is a mixture of about 10% of a vinyldimethylsiloxane end-blocked polydimethylsiloxane with a viscosity at 25° C. of several Pa.s, 65% of a MQ resin having trimethylsiloxane and vinyldimethylsiloxane units as its mono-functional units and 25% of α-olefin having an average chainlength of 18 carbon atoms. Release compositions CREL 2, 3 and 4 were prepared in the same manner, except that instead of only using PR1 or PR2, there was used a mixture of respectively 25, 50 and 75% PR1 in 75, 50 and 25% PR2 respectively.

EXAMPLE 7

Release coatings were applied to Glassine® (AV100) paper using a Euclid® laboratory coater, to give a coverage of 1 $g/m^2$. The coated paper is then placed in an oven at 120° C. or 150° C. till cured to a condition of no smear, no migration and no rub-off (NNN). All further testing was done on these samples when cured to NNN. Laminates were prepared using standard TESA® tapes, after ageing the coated paper for 24 hours at room temperature (20° C.). Two tapes were used in particular, TESA®7475, which uses an acrylic adhesive and TESA®7476, which uses a rubber adhesive. Delamination of the tapes from the paper sheets was effected using a Lloyd® Instrument delaminator at a delamination speed of 0.3 m/minute. Release forces were determined and are given in Table II. Release forces are given in g/20 mm.

TABLE II

| Release Composition | Tape | Release Force |
| --- | --- | --- |
| REL 1 | 7475 | 1400 |
| REL 1 | 7476 | tear |
| REL 2 | 7475 | 430 |
| REL 2 | 7476 | 733 |
| REL 3 | 7475 | 180 |
| REL 3 | 7476 | 403 |
| REL 4 | 7475 | 78 |
| REL 4 | 7476 | 157 |
| REL 5 | 7475 | 120 |
| REL 5 | 7476 | 95 |
| REL 6 | 7475 | 10 |
| REL 6 | 7476 | 45 |
| CREL 1 | 7475 | 360 |
| CREL 1 | 7476 | 800 |
| CREL 2 | 7475 | 160 |
| CREL 2 | 7476 | 150 |
| CREL 3 | 7475 | 75 |
| CREL 3 | 7476 | 80 |
| CREL 4 | 7475 | 20 |

TABLE II-continued

| Release Composition | Tape | Release Force |
|---|---|---|
| CREL 4 | 7476 | 75 |
| CREL 5 | 7475 | 10 |
| CREL 5 | 7476 | 58 |

It is clear from the data in Table II that the use of a composition according to the invention provides a higher release force than the use of prior art compositions.

That which is claimed is:

1. A release modifier which comprises (i) a MQ resin consisting essentially of units of the formulae $SiO_2$ (Q) and $R_3SiO_{1/2}$ (M) wherein R is selected from the group consisting of a monovalent hydrocarbon group having up to 3 carbon atoms, a hydrogen atom and an alkenyl group of the formula —R'CH=$CH_2$, wherein R' denotes an alkylene group of from 0 to 3 carbon atoms, provided there is at least one group —R'CH=$CH_2$ present per MQ molecule and (ii) a α,ω-diolefin having the general formula $CH_2$=CH—$(CH_2)_n$—CH=$CH_2$, wherein n denotes an integer with a value of from 4 to 18.

2. A release modifier according to claim 1 wherein the MQ resin has a ratio of M units to Q units of from 0.6/1 to 1.1/1.

3. A release modifier according to claim 1 wherein the alkenyl group is vinyl.

4. A release modifier according to claim 1 wherein the value of n in the α,ω-diolefin is from 6 to 12.

5. A release modifier according to claim 1 which is solventless and also comprises a linear alkenyl-substituted polydimethylsiloxane material.

6. A release modifier according to claim 1 which is solventless and also comprises a cure inhibitor.

7. A release modifier according to claim 1 which is solventless and also comprises a catalyst.

8. A release modifier according to claim 1 which comprises from 40 to 80% by weight of the MQ resin and from 10 to 50% of the α,ω-diolefin.

9. A solventless release composition comprising (A) a release modifier which comprises (i) a MQ resin consisting essentially of units of the formulae $SiO_2$ (Q) and $R_3SiO_{1/2}$ (M) wherein R is selected from the group consisting of a monovalent hydrocarbon group having up to 3 carbon atoms, a hydrogen atom and an alkenyl group of the formula —R' CH=$CH_2$, wherein R' denotes an alkylene group of from 0 to 3 carbon atoms, provided there is at least one group —R'CH=$CH_2$ present per MQ molecule and (ii) a α,w-diolefin having the general formula $CH_2$=CH—$(CH_2)_n$—CH=$CH_2$, wherein n denotes an integer with a value of from 4 to 18; (B) an organosilicon compound having at least three silicon-bonded hydrogen atoms per molecule; (C) an effective amount of a precious metal catalyst capable of promoting the addition reaction between alkenyl or oxyalkenyl groups and silicon-bonded hydrogen groups and (D) optionally a diorganopolysiloxane having at least 2 alkenyl-functional silicon-bonded substituents.

10. A solventless release composition according to claim 9 wherein the organosilicon compound (B) is selected from the group consisting of compounds having the general formula $R^2_2R^3SiO$—$[R^2_2SiO]_m$—$[R^2HSiO]_n$—$SiR^2_2R^3$ and compounds having the general formula

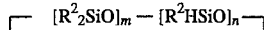

wherein $R^2$ is selected from the group consisting of alkyl and aryl groups having up to 8 carbon atoms, $R^3$ is selected from the group consisting of a group $R^2$ and a hydrogen atom, m has a value of from 0 to 20, n has a value of from 1 to 70, and there are at least 3 silicon-bonded hydrogen atoms present.

11. A solventless release composition according to claim 9 wherein the number ratio of SiH/alkenyl is from 1.1/1 to 1.8/1.

12. A solventless release composition according to claim 9 wherein Component (D) is present and its alkenyl groups are vinyl groups.

13. A solventless release composition according to claim 9 wherein Component (D) is a polydiorganosiloxane having the general formula $X_2Y°SiO$—$[X_2SiO]_x$—$[XYSiO]_y$—$SiX_2Y°$, wherein each X independently is selected from the group consisting of a phenyl radical and a saturated hydrocarbon group having 1 to 6 carbon atoms, at least 90% of all X groups being methyl groups, Y denotes an alkenyl group having up to 6 carbon atoms, Y° is selected from the group consisting of a group Y and a group X and the average value of the sum total of x and y is such that the resulting viscosity of the polydiorganosiloxane is at least 10 mPa.s at 25° C.

14. A solventless release coating according to claim 13 wherein each alkenyl group Y in component (D) is selected from the group consisting of vinyl and hexenyl.

15. A solventless release composition according to claim 9 wherein the weight percentage of component (A) based on the total weight of components (A), (C) and (D) combined is from 10 to 80%.

16. A solventless release composition according to claim 9 which also comprises one or more ingredients selected from the group consisting of cure inhibitors and bath life extenders.

17. A solventless release composition according to claim 9 which is stored by keeping components (A) and (C) separate from component (B).

18. A process of coating a substrate comprising applying to the substrate a solventless release composition according to claim 9 and thereafter causing the composition to cure.

19. A process according to claim 18 wherein the substrate is flexible and the composition is applied to the substrate in a layer of 0.1 to 2.0 grams per square meter of surface.

20. A process according to claim 18 wherein the curing is effected by heating the coated substrate to a temperature below 200° C.

* * * * *